UNITED STATES PATENT OFFICE 2,272,270

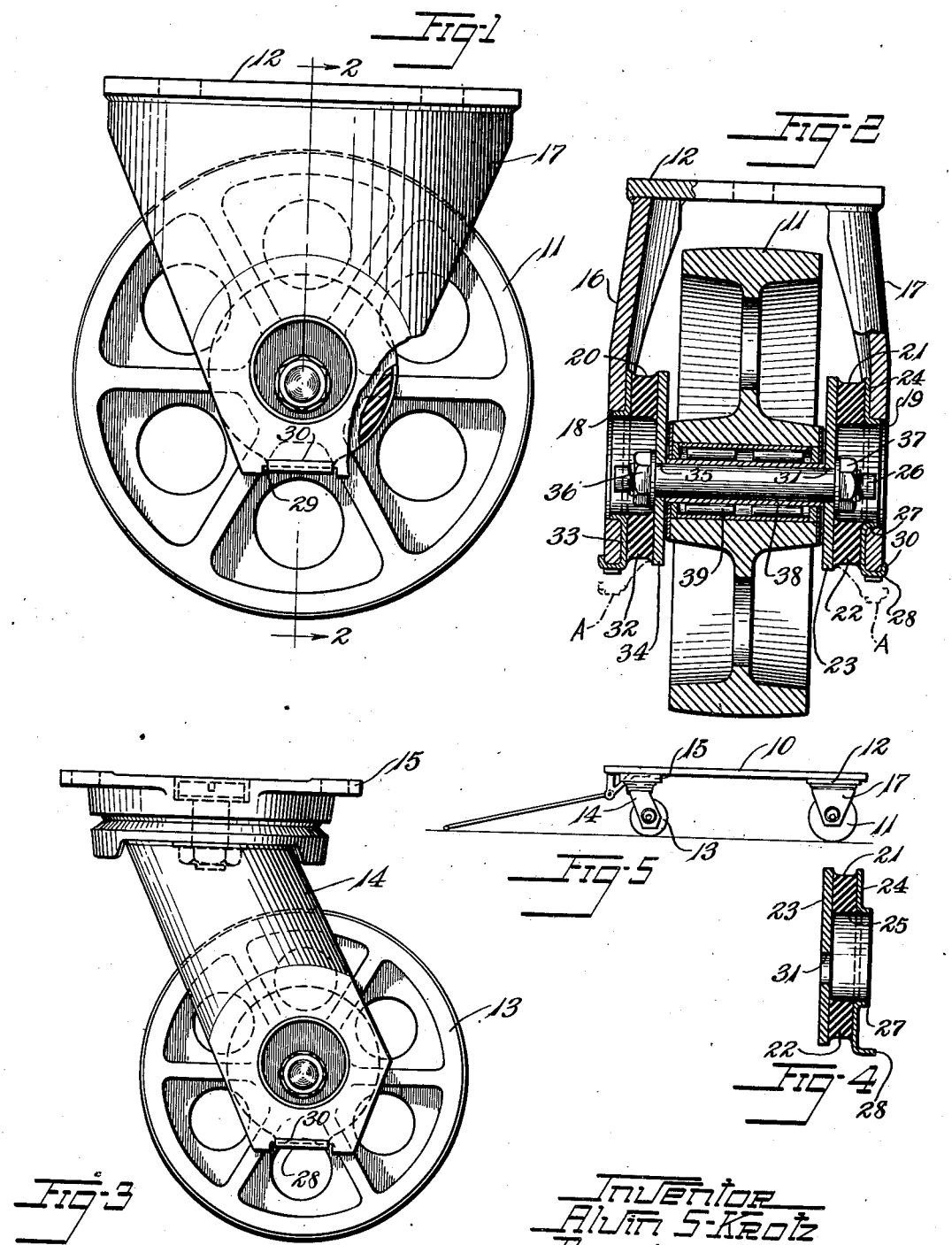
Feb. 10, 1942.   A. S. KROTZ   2,272,270
CUSHIONED MOUNTING FOR WHEELS
Filed Dec. 15, 1939

CUSHIONED MOUNTING FOR WHEELS

Alvin S. Krotz, Akron, Ohio, assignor to The B. F. Goodrich Company, New York, N. Y., a corporation of New York Application December 15, 1939, Serial No. 309,367

9 Claims. (Cl. 267—63)

This invention relates to cushioned mountings for wheels and is useful in spring suspensions for caster and other wheels of vehicles, large or small, including road, rail and other land vehicles, and also smaller vehicles, such as industrial trucks, furniture, office equipment, hospital equipment, especially where space is such as to require a compact mounting.

Heretofore such vehicles have been provided sometimes with rubber-tired wheels and casters which, while quieter in operation than rigid wheels and providing some cushioning of the body, have been very limited in their cushioning effect as a result of the tires of small size acting under mere compression. In the case of industrial trucks the shock of pounding of the wheels has been so severe that floors of wood blocks and other types sometimes have been seriously damaged and tires have worn out prematurely.

The principal objects of the present invention are to provide improved cushioning of the supported body, to provide compactness of the cushioning structure, to reduce unsprung weight, to effect individual cushioning of wheels, to provide for individual castering thereof, to utilize effectively the considerable amplitude of cushioning movement made possible by rubber-like material under shear stress, to provide simplicity of construction, to provide ease and simplicity of replacement, and to provide for cushioning of uncushioned wheels without extensive alterations.

These and other objects will appear from the following description and the accompanying drawing.

Of the drawing:

Fig. 1 is a side elevation of a suspension constructed according to and embodying the invention as applied to a non-castering wheel of an industrial truck, parts being broken away and parts shown in section.

Fig. 2 is a vertical cross-section thereof taken on line 2—2 of Fig. 1.

Fig. 3 is a side elevation of a suspension according to the invention as applied to a caster.

Fig. 4 is a vertical cross-sectional view of a spring constructed in accordance with the invention.

Fig. 5 is a side elevation of an industrial truck equipped with spring suspensions in accordance with the invention.

Referring to the drawing, an industrial truck body 10 is supported by a pair of non-castering rear wheels such as 11 mounted in leg brackets 12, secured to the body, and one or more caster wheels 13 mounted on castering brackets 14 pivotally supporting the body through brackets 15 secured to the body.

As the mounting of the wheel 13 in the bracket 14 may be identical with the mounting of the wheel 11 in the bracket 12. The bracket 12 is formed with two legs 16, 17 having aligned openings 18, 19, accommodating the ends of the wheel axles. For cushioning the wheel in accordance with the invention, a pair of cushion members 20, 21 are secured, one to each leg of the bracket.

One of these cushioning members 21 is shown in Fig. 4 and comprises a cushioning body 22 of soft vulcanized rubber or other resilient rubber-like cushioning material, and a pair of metallic plates 23, 24 united to opposite face thereof preferably by a vulcanized bond. The cushioning body 22 is preferably of annular form, with a recess in the form of an opening 25 therethrough to accommodate movements of the wheel axle 26. The plate 24 is also provided with an opening in alignment with the opening 25 of the cushion and is formed thereabout with a dowel flange 27 at the margin of the opening 25.

To prevent rotation of the plate 24, a tongue 28 is formed thereon and is bent outwardly along the leg 17 where it engages a notch 29 formed in the leg. When the leg and cushioning member have been assembled with the flange 27 in the opening 19, the tongue 28 may be bent upwardly along the outer face of the leg 17 as at 30 to lock the cushioning member in place. Detachment is simply effected in reverse fashion by first bending the tongue 28 down.

The plate 23 is formed with an axle-retaining aperture 31 preferably below the center of the openings 19 and 25 so as to permit greater clearance for deflection of the bracket 12 when loaded.

The leg 16 is similarly supported from the cushioning member 20 which similarly comprises a cushioning body 32 bonded by vulcanization to spaced plates 33, 34, plate 33 being doweled to the leg 16 and the plate 34 having an axle-retaining aperture 35 in alignment with aperture 31.

The solid line showing of Figs. 1 and 2 indicates the positions of the parts when the mountings are under no load. When loaded, the bracket 12 descends to a position such as is indicated by the broken lines at A, A in Fig. 2, whereupon the axle assumes a position more nearly central in the recesses in the mountings, giving good clearance for cushioning movements in all directions.

The axle 26 extends through the apertures 31, 35 and is threaded at its ends to engage retaining nuts 36, 37. A sleeve 38 extends between plates 23, 34 and about the axle 26 and the plates 23, 34 are clamped against the ends of the sleeve by the nuts 36, 37. The wheel 11 is rotatably mounted on sleeve 38 between plates 23, 34 and may have a roller bearing 39 to reduce friction. The axle is preferably of such length as to extend into the apertures 18, 19 so that should the truck be overloaded or the cushioning structure fail under load, the axle would be retained by the leg bracket.

When the bracket 12 is loaded and the wheel 11 rests upon a supporting surface, the load is entirely transmitted through the cushioning members 20, 21, the cushions 22, 32 supporting the load by shear loading thereof and also cushioning any end thrust of the wheel by compression and tension.

By cushioning the wheel adjacent its axle castering of the wheel in the usual manner is not interfered with as the entire leg bracket 14 may swivel with respect to the fixed bracket 15 (see Fig. 3), and the same cushioning members may be used either with caster wheels or wheels not mounted for castering. Also, but a small space is occupied by the suspension and in a location that does not require objectionable cutting down of the wheel size. The utilization of the cushion under shear stress makes for uniform cushioning movement and softness of riding quality.

When cushion members are to be provided on original equipment the plates 24, 33 may be eliminated and the cushioning bodies 22, 32 bonded on the legs 16, 17 of the bracket 12, although the construction shown is more convenient in permitting replacement and it facilitates manufacture as compared with molding the rubber directly onto the bracket.

The invention makes possible a low amount of unsprung weight in the vehicle and is compact. The cushioning action afforded by the suspension of the invention so relieves the floor and vehicle of impact shocks that the addition of rubber tires to the metal wheels is made unnecessary. Such tires may be added, however, if desired. The suspension units of the invention may constitute the primary springs of the vehicle, or they may be used in an auxiliary capacity, if desired, to supplement other suspension means.

Variations may be made without departing from the scope of the invention as it is defined by the following claims.

I claim:

1. A spring suspension for a vehicle in which a structure comprising a bracket is supported by an axle, said suspension comprising a pair of members connected respectively to said structure and axle, said members having opposed faces extending generally in the vertical direction, and a body of rubber-like material between said faces and bonded thereto for cushioning vertical springing movements by shear stress on said body, the axle being secured to one of said members and being movable with respect to the other member, the said other member being recessed to accommodate vertical movements of the axle and being adapted to be secured to said bracket.

2. In a spring suspension for a vehicle in which a structure comprising a bracket is supported by an axle, said suspension comprising a pair of members having opposed faces extending generally in a vertical direction, a body of rubber-like material between said faces and bonded thereto for cushioning vertical springing movements by shear stress on said body, the axle extending through and being secured to one of said members, and the said body and the other of said members being apertured for accommodating vertical movement of the axle and being adapted to be secured to said bracket.

3. A spring for a vehicle suspension, said spring comprising a pair of opposed plates and a body of rubber-like material between said plates and bonded thereto for cushioning vertical springing movements by shear stress on said body, one of said plates and said body being recessed for accommodating vertical movements of a supporting structure and the other of said plates having a relatively small recess for the reception and attachment of said supporting structure, and the first said plate having a bendable tab integral therewith for attachment to the vehicle.

4. A spring suspension for an industrial truck or like vehicle in which an axle wheel is supported in a forked bracket, said suspension comprising a spring secured to each arm of said bracket, each spring comprising plate-like members having opposed faces extending in the vertical direction and a body of rubber-like material between said faces and bonded thereto for cushioning vertical springing movements by shear stress of the body, one of said members being apertured for the reception and attachment of the wheel axle, and said body and the other of said members being recessed for accommodating an end portion of a wheel axle and for providing clearance for vertical movements thereof, and having means for detachably engaging a limb of said bracket.

5. A cushioned wheel mounting comprising an axle having a wheel rotatably mounted thereon, a forked member adapted to straddle said wheel and directly to support a load from each end of said axle, and cushioning structures supported by each limb of said forked member and said axle for cushioning the load, said cushioning structures each comprising a resilient rubber-like body adapted to sustain the load entirely by shear loading of said body.

6. A cushioned wheel mounting comprising an axle having a wheel rotatably mounted thereon, a forked member adapted to straddle said wheel and to support a load from each end of said axle, and cushioning structures supported by each limb of the forked member and said axle for cushioning the load, said cushioning structures each comprising a pair of plates and an intervening resilient body of rubber-like material bonded thereto, one of said plates being mounted upon a limb of said forked member and the other being mounted upon said axle.

7. In a spring suspension for a vehicle in which a structure is supported by an axle, said suspension comprising a pair of members having opposed faces extending generally in a vertical direction, a body of rubber-like material between said faces and bonded thereto for cushioning vertical springing movements by shear stress on said body, the axle extending through and being secured to one of said members, and the said body and the other of said members being apertured for accommodating vertical movement of the axle, said axle extending through the member to which it is secured at a position below the center of the aperture in said body and other member.

8. A spring suspension for a vehicle comprising a supported structure having an apertured bracket, an axle having a wheel rotatably mounted thereon and being positioned for vertical movement of said axle in the aperture of said bracket, an apertured plate secured against the bracket with the axle movable in the plate aperture, a second plate secured to the axle, and a body of resilient rubber-like material between said plates and bonded thereto, said plates being disposed substantially parallel and vertical, and said body cushioning vertical springing movements by shear stress on the body.

9. A cushioned structure for supporting a body from a wheel axle, said structure comprising a pair of spaced-apart plate elements and a resilient body of rubber-like material between said plate elements and secured thereto by a vulcanized bond for cushioning vertical springing movements by shear stress on said body, said body and one of said plate elements being apertured for accommodating vertical movement of the axle, and the other plate element having a relatively small axle-mounting recess offset with respect to the center of the aperture in the body and a marginal portion about said recess entirely within the area of said aperture.

ALVIN S. KROTZ.